US012590012B2

(12) United States Patent
Kato et al.

(10) Patent No.: US 12,590,012 B2
(45) Date of Patent: *Mar. 31, 2026**

(54) NEGATIVE THERMAL EXPANSION MATERIAL AND COMPOSITE MATERIAL

(71) Applicant: NIPPON CHEMICAL INDUSTRIAL CO., LTD., Tokyo (JP)

(72) Inventors: Takuma Kato, Tokyo (JP); Junya Fukazawa, Tokyo (JP); Toru Hata, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/839,848

(22) PCT Filed: Feb. 22, 2023

(86) PCT No.: PCT/JP2023/006527
§ 371 (c)(1),
(2) Date: Aug. 20, 2024

(87) PCT Pub. No.: WO2023/163057
PCT Pub. Date: Aug. 31, 2023

(65) Prior Publication Data
US 2025/0109033 A1 Apr. 3, 2025

(30) Foreign Application Priority Data

Feb. 25, 2022 (JP) ................................. 2022-027910
May 16, 2022 (JP) ................................. 2022-080386

(51) Int. Cl.
*C01G 31/00* (2006.01)

(52) U.S. Cl.
CPC ........ *C01G 31/006* (2013.01); *C01P 2002/72* (2013.01); *C01P 2004/03* (2013.01);
(Continued)

(58) Field of Classification Search
None
See application file for complete search history.

(56) References Cited

U.S. PATENT DOCUMENTS

| | | | |
|---|---|---|---|
| 12,275,646 B1 * | 4/2025 | Fukazawa | ............... C01G 31/02 |
| 12,297,123 B2 * | 5/2025 | Fukazawa | ............. C04B 35/495 |
| 2023/0416495 A1 * | 12/2023 | Takenaka | ............. C04B 35/457 |

FOREIGN PATENT DOCUMENTS

| | | |
|---|---|---|
| CN | 103433049 A | 12/2013 |
| CN | 112390642 B | 1/2023 |

(Continued)

OTHER PUBLICATIONS

Liang et al. (Negative thermal expansion property of β-Cu2V2O7; Solid State Ionics 343; 1150, 2019).*

(Continued)

*Primary Examiner* — Guinever S Gregorio
(74) *Attorney, Agent, or Firm* — WHDA, LLP

(57) ABSTRACT

An object of the present invention is to provide a negative thermal expansion material having better negative thermal expansion characteristics. The present invention is a negative thermal expansion material, comprising a copper vanadium composite oxide represented by the following general formula (1): $Cu_xCa_yV_zO_t$. In the general formula (1), $0<x<2.50$, $0<y<2.00$, $1.70 \leq z \leq 2.30$, $6.00 \leq t \leq 9.00$, and $1.00 \leq x+y \leq 3.00$.

15 Claims, 3 Drawing Sheets

(52) U.S. Cl.
CPC ...... *C01P 2004/32* (2013.01); *C01P 2004/61* (2013.01); *C01P 2004/62* (2013.01); *C01P 2006/12* (2013.01); *C01P 2006/32* (2013.01)

(56) References Cited

FOREIGN PATENT DOCUMENTS

| | | | |
|---|---|---|---|
| JP | 2005-035840 | A | 2/2005 |
| JP | 2005-217377 | A | 8/2005 |
| JP | 2015-010006 | A | 1/2015 |
| JP | 2018-002577 | A | 1/2018 |
| JP | 2019-210198 | A | 12/2019 |
| WO | 2010/101153 | A1 | 9/2010 |
| WO | 2022/114004 | A1 | 6/2022 |

OTHER PUBLICATIONS

Liang et al.; Negative thermal expansion property of β-Cu2V2O7; Solid State Ionics; vol. 343, 115086; Dec. 15, 2019.*

Ryo et al.; Antiferromagnetic order of ferromagnetically coupled dimers in the double pyrovanadate CaCoV2O7; Aug. 2, 2021.*

Fang et al.; CN103433049; translation provided by Google Patents, Jul. 21, 2025.*

Zhang, N. et al., "Tailored thermal expansion and electrical properties of α-Cu2V2O7/Al", Ceramics International, 2016, vol. 42, pp. 17004-17008, cited in Specification. (5 pages).

Yamada, I. et al., "Synergistically Enhanced Oxygen Evolution Reaction Catalysis for Multielement Transition-Metal Oxides", 2018, 1, ACS Applied Energy Materials, pp. 3711-3721, cited in ISR, JP Notice of Reasons for Refusal and JP Decision to Grant a Patent. (11 pages).

Mosafer, H. S. R. et al., "The crystal structure and thermal expansion of novel substitutionally disordered Ca10TM0.5(VO4)7(TM= Co, Cu) orthovanadates", Dalton Transactions, 2021, 50, pp. 14762-14773, cited in ISR, JP Notice of Reasons for Refusal and JP Decision to Grant a Patent. (12 pages).

International Search Report dated May 16, 2023, issued in counterpart International Application No. PCT/JP2023/006527, with English translation. (7 pages).

Notice of Reasons for Refusal dated Sep. 26, 2023, issued in counterpart JP Patent Application No. 2022-080386, with English translation. (5 pages).

Decision to Grant a Patent dated Dec. 12, 2023, issued in counterpart JP Patent Application No. 2022-080386, with English translation. (5 pages).

* cited by examiner

NEGATIVE THERMAL EXPANSION MATERIAL AND COMPOSITE MATERIAL

TECHNICAL FIELD

The present invention relates to a negative thermal expansion material, which contracts with an increase in temperature, and a composite material containing the negative thermal expansion material.

If the temperature rises, many substances increase in length or volume due to thermal expansion. Meanwhile, materials that contract upon heating (hereinafter occasionally referred to as "negative thermal expansion materials") are also known.

It is known that the use of materials exhibiting negative thermal expansion with other materials enables suppressing the thermal expansion change of the materials with temperature variation.

As materials exhibiting negative thermal expansion, for example, β-eucryptite, zirconium tungstate ($ZrW_2O_8$), zirconium phosphate tungstate ($Zr_2WO_4$ ($PO_4$)$_2$), $Zn_xCd_{1-x}$ ($CN$)$_2$, manganese nitride, and bismuth-nickel-iron oxide are known.

It is known that the linear coefficient of expansion of zirconium phosphate tungstate is −3.4 to −3.0 ppm/° C. in the temperature range of 0 to 400° C., and zirconium phosphate tungstate is high in negative thermal expandability. The combined use of the zirconium phosphate tungstate and a material exhibiting positive thermal expansion (hereinafter occasionally referred to as to a "positive thermal expansion material") enables producing a low thermal expansion material (for example, refer to Patent Literatures 1 and 2). The combined use of a polymer such as a resin that is a positive thermal expansion material and a negative thermal expansion material has been proposed (for example, refer to Patent Literature 3).

The following Non Patent Literature 1 discloses that a copper vanadium composite oxide, α-$Cu_2V_2O_7$, has a linear coefficient of expansion of −5 to −6 ppm/° C. in the range of room temperature to 200° C. Methods for further improving negative thermal expansion characteristics by partially substituting the Cu atoms of the copper vanadium composite oxide with atoms of at least one element selected from Zn, Ga, and Fe or by partially substituting the V atoms with P atoms have also been proposed (Patent Literatures 4 to 5).

CITATION LIST

Patent Literature

Patent Literature 1
   Japanese Patent Laid Open No. 2005-35840
Patent Literature 2
   Japanese Patent Laid Open No. 2015-10006
Patent Literature 3
   Japanese Patent Laid Open No. 2018-2577
Patent Literature 4
   Japanese Patent Laid Open No. 2019-210198
Patent Literature 5
   Chinese Patent No. CN112390642

Non Patent Literature

Non Patent Literature 1
   Ceramics International, Vol. 42, p 17004-17008 (2016)

SUMMARY OF INVENTION

Technical Problem

The copper vanadium composite oxides of Non Patent Literature 1 and Patent Literatures 4 and 5 have low linear coefficients of expansion as compared with zirconium phosphate tungstate. However, the above-mentioned copper vanadium composite oxides are required to have further improved negative thermal expansion characteristics as compared with the copper vanadium composite oxide of Non Patent Literature 1 from the viewpoint of being industrially advantageously produced from lower-price raw materials, and being better in water resistance.

Accordingly, an object of the present invention is to provide a negative thermal expansion material having better negative thermal expansion characteristics.

Solution to Problem

The present inventors have examined a method for further improving the negative thermal expansion characteristics of a copper vanadium composite oxide, $Cu_2V_2O_7$, found that Ca is dissolved and incorporated in the copper vanadium composite oxide to improve the negative thermal expansion characteristics and completed the present invention.

Accordingly, the present invention (1) provides a negative thermal expansion material, comprising a copper vanadium composite oxide represented by the following general formula (1):

$$Cu_xCa_yV_zO_t \tag{1}$$

wherein $0<x<2.50$, $0<y<2.00$, $1.70 \leq z \leq 2.30$, $6.00 \leq t \leq 9.00$, and $1.00 \leq x+y \leq 3.00$.

The present invention (2) provides the negative thermal expansion material of (1), wherein a coefficient of thermal expansion is $-10.0 \times 10^{-6}$/K or less.

The present invention (3) provides the negative thermal expansion material of (1) or (2), wherein an average particle size is 0.1 to 100 μm.

The present invention (4) provides the negative thermal expansion material of any of (1) to (3), wherein BET specific surface area is 0.05 to 50 m²/g.

The present invention (5) provides the negative thermal expansion material of any of (1) to (4), wherein a content of spherical particles with a sphericity of 0.7 or more and 1.0 or less is 75% or more based on the number.

The present invention (6) provides the negative thermal expansion material of any of (1) to (5), wherein the negative thermal expansion material further comprises dissolved phosphorus.

The present invention (7) provides a composite material, comprising the negative thermal expansion material of any of (1) to (6) and a positive thermal expansion material.

The present invention (8) provides the composite material of (7), wherein the positive thermal expansion material is at least one selected from metals, alloys, glasses, ceramics, rubbers, and resins.

Advantageous Effects of Invention

According to the present invention, a negative thermal expansion material having better negative thermal expansion characteristics can be provided.

DESCRIPTION OF EMBODIMENTS

Figure 1:
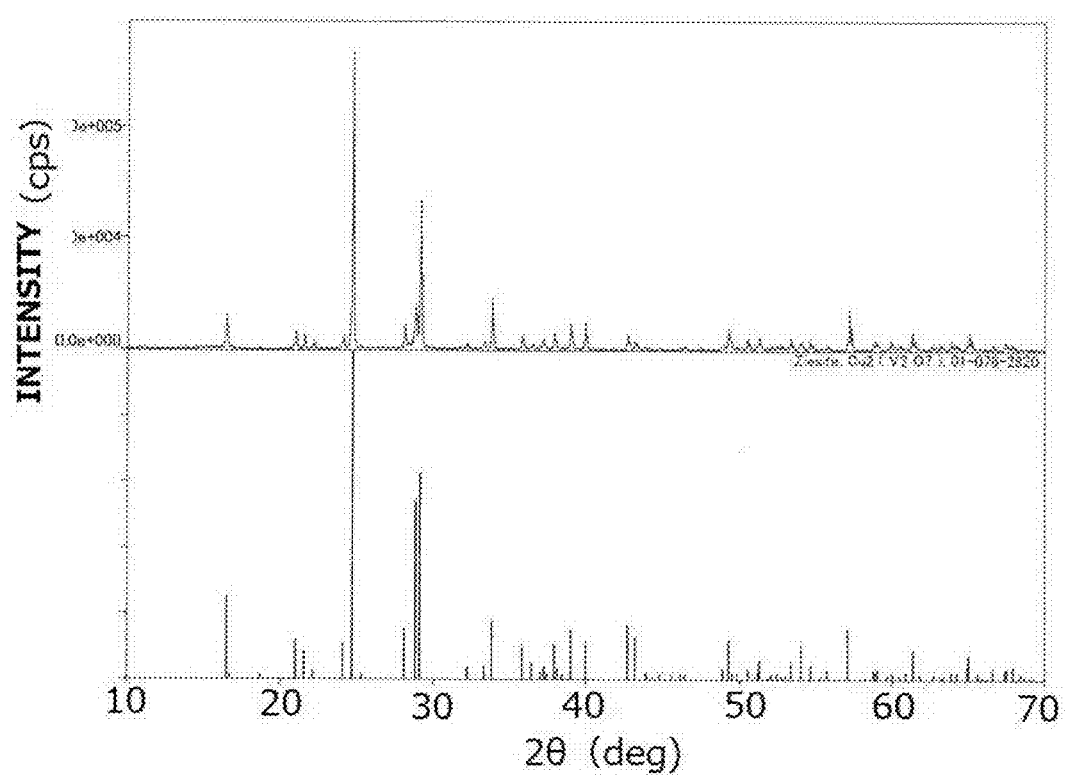
FIG. 1 is the X-ray diffraction pattern of a negative thermal expansion material sample obtained in Example 1.

Hereinafter, the present invention will be described based on preferable embodiments thereof.

A negative thermal expansion material of the present invention is characterized by comprising a copper vanadium composite oxide represented by the following general formula (1):

$$Cu_xCa_yV_zO_t \qquad (1)$$

wherein $0<x<2.50$, $0<y<2.00$, $1.70 \leq z \leq 2.30$, $6.00 \leq t \leq 9.00$, and $1.00 \leq x+y \leq 3.00$.

In general formula (1), $0<x<2.50$. x satisfies preferably $1.00 \leq x \leq 2.30$ and particularly preferably $1.50 \leq x \leq 2.20$ in that the negative thermal expansion characteristics are further increased.

In general formula (1), $0<y<2.00$. y satisfies preferably $0.005 \leq y \leq 1.00$, particularly preferably $0.01 \leq y \leq 0.50$, and still preferably $0.02 \leq y \leq 0.40$ in that the negative thermal expansion characteristics are further increased.

In general formula (1), $1.70 \leq z \leq 2.30$. z satisfies preferably $1.80 \leq z \leq 2.20$ in that the negative thermal expansion characteristics are further increased.

In general formula (1), $6.00 \leq t \leq 9.00$. t satisfies preferably $6.00 \leq t \leq 8.00$ in that the negative thermal expansion characteristics are further increased.

However, in general formula (1), $1.00 \leq x+y \leq 3.00$. x+y satisfies preferably $1.50 \leq x+y \leq 2.50$ in that the negative thermal expansion characteristics are further increased.

The BET specific surface area of the negative thermal expansion material of the present invention is, but not particularly limited to, preferably 0.05 to 50 m²/g, particularly preferably 0.10 to 10 m²/g, and still preferably 0.20 to 8 m²/g. If the negative thermal expansion material is used as a filler for resin or glass, the BET specific surface area of the negative thermal expansion material in the above-mentioned range facilitates the handle thereof. Note that the BET specific surface area of the negative thermal expansion material in the present invention is a value measured with the fully automatic specific surface area measuring apparatus Macsorb (available from Mountech Co., Ltd.) by the BET one-point method.

The average particle size of the negative thermal expansion material of the present invention is determined by scanning electron microscopy observation, and is, but not particularly limited to, preferably 0.1 to 100 μm and particularly preferably 0.2 to 80 μm. If the negative thermal expansion material is used as a filler for resin or glass, the average particle size of the negative thermal expansion material in the above-mentioned range facilitates the handle thereof. In the present invention, the arithmetic mean value of the sizes of 20 particles randomly sampled in the scanning electron microscopy observation at a magnification of 1000 was calculated as the average particle size of the negative thermal expansion material. At this time, the particle size of each particle means the length of the longest segment (the maximum length) among the line segments passing across a two-dimensional projection image of the particle.

The particle shape of the negative thermal expansion material of the present invention may be, but not particularly limited to, for example, spherical, granular, plate-like, scaly, whisker-like, rod-like, filamentous, or a crushed shape. However, the negative thermal expansion material still preferably contains many spherical particles from the viewpoint of enabling suppressing the production of particulates by chipping during the mixing of the negative thermal expansion material with the positive thermal expansion material and mixing thereof more uniformly.

The spherical particles in the present invention does not have to be necessarily true spherical particles, and means particles with sphericities of 0.70 or more and 1.00 or less.

A specimen is observed at a magnification of 100 to 1000 through an electron microscope, followed by image-analysis processing to obtain parameters. The sphericity in the present invention is calculated from the obtained parameters in accordance with the following calculation expression (1):

$$Sphericity = \text{diameter equivalent to diameter of circle with equal area/circumscribed circle diameter} \qquad (1)$$

wherein the diameter equivalent to the diameter of the circle with equal area refers to the diameter of a circle having a circumference that is equivalent to the perimeter of a particle. The circumscribed circle diameter refers to the longest diameter of the particle.

The content of the spherical particles with sphericities of 0.70 or more and 1.00 or less in the negative thermal expansion material of the present invention is preferably 75% or more and particularly preferably 80% or more based on the number. The content of the spherical particles with sphericities of 0.70 or more and 1.00 or less in the negative thermal expansion material in the above-mentioned range suppresses the production of particulates by chipping during the mixing of the negative thermal expansion material with the positive thermal expansion material. Such a content also makes the negative thermal expansion material better in terms of dispersibility in the positive thermal expansion material and filling characteristics.

In the present invention, the content of spherical particles with sphericities of 0.70 or more and 1.00 or less means the content ratio (percent) based on the number of the spherical particles with sphericities of 0.70 or more and 1.00 or less calculated in accordance with the above-mentioned calculation expression (1) in the randomly sampled 50 particles by observing specimen with an electron microscope at a magnification of 100 to 1000 and image-analysis processing.

Examples of the image analyzer for the image-analysis processing include LUZEX (available from NIRECO CORPORATION) and PITA-04 (available from SEISHIN ENTERPRISE Co., Ltd.). As the sphericity becomes more approximate to 1, the particle becomes more similar to a true spherical particle.

The negative thermal expansion material of the present invention has high negative thermal expansion characteristics as compared with the copper vanadium composite oxide, $\alpha\text{-}Cu_2V_2O_7$. That is, the negative thermal expansion material of the present invention has a low coefficient of thermal expansion as compared with the copper vanadium composite oxide, $\alpha\text{-}Cu_2V_2O_7$.

In the present invention, the coefficient of thermal expansion is determined by the following procedure. To 1.00 g of a sample is first added 0.05 g of propylene carbonate, followed by pulverization and mixing with a mortar for 3 minutes. Then, 0.15 g thereof is weighed, and the entire amount thereof is filled into a metal mold with a diameter of 6 mm and subsequently molded with a hand press under a pressure of 0.5 t to manufacture a powder molding. The temperature of the obtained powder molding is raised to 700° C. in an electric furnace over 3 hours and held for 4 hours to manufacture a ceramic molding. The manufactured ceramic molding is measured for the coefficient of thermal expansion with a thermomechanical measuring apparatus (for example, TMA4000SE available from NETZSCH Japan K.K.). The ceramic molding is repeatedly measured twice in the temperature range of 50 to 425° C. under the measuring conditions wherein the atmosphere is nitrogen, and the load is 10 g. The coefficient of thermal expansion at 50 to 400° C. in the second measurement is defined as the coefficient of thermal expansion of the negative thermal expansion material.

As long as the coefficient of thermal expansion of the negative thermal expansion material of the present invention is low as compared with that of the copper vanadium composite oxide, $\alpha$-$Cu_2V_2O_7$, the coefficient is, but not limited to, $-10.0 \times 10^{-6}$/K or less, preferably $-12.0 \times 10^{-6}$/K or less. Under the above-mentioned condition, the lower limit of the coefficient is, but not limited to, around $-50.0 \times 10^{-6}$/K or more and preferably $-40.0 \times 10^{-6}$/K or more. The coefficient of thermal expansion is particularly preferably $-50.0 \times 10^{-6}$ to $-10.0 \times 10^{-6}$/K in that the coefficient of the negative thermal expansion material easily offsets the positive expansion upon the combination of the negative thermal expansion material of the present invention with the positive thermal expansion material.

The copper vanadium composite oxide represented by general formula (1), basically includes the ziesite phase ($\beta$-phase) and the blossite phase ($\alpha$-phase), and also includes a mixed phase thereof. The negative thermal expansion material of the present invention may be the ziesite phase ($\beta$-phase), the blossite phase ($\alpha$-phase) or the mixed phase of the ziesite phase ($\beta$-phase) and the blossite phase ($\alpha$-phase). The negative thermal expansion material of the present invention is preferably a single phase of the ziesite phase ($\beta$-phase) or in a mixed phase wherein the main peak at around $2\theta=250$ derived from the ziesite phase ($\beta$-phase), is higher than the main peak at around $2\theta=270$ derived from the blossite phase ($\alpha$-phase), upon the X-ray diffraction analysis thereof, and the ziesite phase ($\beta$-phase) is contained in a larger amount from the viewpoint that the negative thermal expansion material is better in terms of negative thermal expandability.

In the present invention, the phrase "around $2\theta=25°$" means that $2\theta=23.5$ to $26.5°$. The phrase "around $2\theta=27°$" means that $2\theta=26.8$ to $27.80°$.

In the negative thermal expansion material of the present invention, upon the X-ray diffraction analysis of the negative thermal expansion material using CuK$\alpha$ line as a radiation source, diffraction peaks at around $2\theta=25°$ are derived from the ziesite phase ($\beta$-phase), and diffraction peaks at around $2\theta=270$ are derived from the blossite phase ($\alpha$-phase).

In the present invention, phosphorus can be dissolved and incorporated in the copper vanadium composite oxide represented by the above-mentioned general formula (1) as needed for adjusting the negative thermal expandability or improving the dispersibility in the positive thermal expansion material. That is, examples of the negative thermal expansion material of the present invention include a negative thermal expansion material comprising the copper vanadium composite oxide represented by the above-mentioned general formula (1) wherein phosphorus is dissolved.

The coefficient of thermal expansion increases with the amount of phosphorus dissolved and incorporated. By adjusting the molar ratio of the P atoms to the V atoms (P/V) in the copper vanadium composite oxide represented by the above-mentioned general formula (1) to more than 0.0 and 0.3 or less, preferably more than 0.0 and 0.2 or less, a negative thermal expansion material having a coefficient of thermal expansion of $-10.0 \times 10^{-6}$/K or less, preferably $-12.0 \times 10^{-6}$/K or less can be obtained.

The method for producing the negative thermal expansion material of the present invention is not particularly limited, but the negative thermal expansion material is industrially advantageously produced by the following first and second steps.

The method for producing the negative thermal expansion material of the present invention is characterize by comprising:

the first step of mixing a Cu source, a Ca source, and a V source to prepare a raw material mixture and the second step of firing the raw material mixture to obtain the negative thermal expansion material.

The first step is a step of mixing a Cu source, a Ca source, and a V source to prepare a raw material mixture.

Examples of the Cu source related to the first step include copper salts of organic carboxylic acids such as copper gluconate, copper citrate, copper acetate, and copper lactate; copper salts of mineral acids; copper oxides; and copper hydroxides.

Examples of the Ca source related to the first step include carbonates, oxide, hydroxide, halides, and carboxylates of calcium. Examples of the carboxylates of calcium include gluconates, citrates, oxalates, acetates, and lactates.

Examples of the V source related to the first step include vanadic acid and sodium salt, potassium salt, and ammonium salt thereof; carboxylates; and vanadium oxides such as vanadium pentoxide. Examples of vanadium salts of carboxylic acids include monocarboxylates such as formate, acetate, glycolate, lactate, and gluconate; dicarboxylates such as oxalate, maleate, malonate, malate, tartrate, and succinate; and carboxylates having three carboxyl groups such as citrate.

In the first step, the mixing amounts of the Cu source, the Ca source, and the V source mixed be preferably adjusted suitably so that the molar ratio of the Cu atoms to the Ca atoms to the V atoms in the raw material mixture corresponds to the composition of the copper vanadium composite oxide represented by the above-mentioned general formula (1).

In the first step, the Cu source, the Ca source, and the V source can be mixed by a wet or dry process, but the sources are preferably mixed by the wet process in that the wet process enables obtaining a uniform raw material mixture easily. The method for wet-mixing the raw materials is preferably performed using a solvent that does not dissolve the Cu source, the Ca source, or the V source or scarcely dissolves the sources in that such a solvent facilitates obtaining the raw material mixture in which the sources are uniformly dispersed, and therefore facilitates obtaining a single-phase copper vanadium composite oxide represented by the general formula (1) and confirmed by X-ray diffraction. Although the solvent for the wet mixing varies depending on the types of the Cu source, the Ca source, and the V source, examples of the solvent include water, methanol, and ethanol. The average particle size of the Cu source, the Ca source, and the V source is preferably 50 μm or less and particularly preferably 0.1 to 40 μm in terms of the average particle size (D50) determined by laser diffraction in that the reactivity is enhanced.

As long as slurry in which the raw materials are uniformly dispersed is obtained, the apparatus for wet mixing is not particularly limited. In the preparation of the slurry, the slurry can be wet-pulverized with a media mill as needed. Examples of the media mill include media mills such as bead mills, ball mills, paint shakers, attritors, sand mills. Small amounts of raw materials may be wet-mixed with a mortar in a laboratory.

A dispersant may be mixed into the slurry from the viewpoint of still more efficient wet mixing. Examples of the dispersant to be mixed into the slurry include various surfactants and an ammonium salt of polycarboxylic acid. The concentration of the dispersant in the slurry is preferably 0.01 to 10% by mass and particularly preferably 0.1 to 5% by mass in that the dispersive effect is enhanced.

After the wet mixing, the entire amount is dried, and the solvent is removed to obtain the raw material mixture.

In the first step, the Cu source, the Ca source, and the V source are dissolved in a water solvent, and the water solvent can also be then removed to obtain the raw material mixture. In this case, the Cu source, the Ca source, and the V source that are soluble in the water solvent only have to be used. Examples of the Cu source soluble in the water solvent include copper salts of organic carboxylates and copper salts of mineral acids. Examples of the Ca source soluble in the water solvent include calcium salts of organic carboxylates, carbonates, and hydroxide.

Examples of the V source soluble in the water solvent include vanadic acid and sodium salt, potassium salt, and ammonium salt thereof, and carboxylates.

If a vanadium salt of carboxylic acid is used as the V source in the first step, vanadium pentoxide, a reducing agent, and a carboxylic acid are added to the water solvent, and the mixture is heat-treated at 60 to 100° C. to produce a vanadium salt of the carboxylic acid. This reaction solution is used as it is, and the Cu source and the Ca source are mixed to obtain the raw material-mixed solution containing the Cu source, the Ca source, and the V source. The water solvent may be then removed from the raw material-mixed solution to prepare the raw material mixture.

The reducing agent is preferably a reducing sugar. Examples of the reducing sugar include glucose, fructose, lactose, maltose, and sucrose. Among these, lactose and sucrose are particularly preferable from the viewpoint that lactose and sucrose are highly reactive. The amount of the reducing sugar added is preferably 0.7 to 3.0 and more preferably 0.8 to 2.0 in terms of the molar ratio of C in the reducing sugar to V in vanadium pentoxide (C/V) in that the reductive reaction can be performed efficiently. The amount of the carboxylic acid added is preferably 0.1 to 4.0 and more preferably 0.2 to 3.0 in terms of the molar ratio of the carboxylic acid to vanadium pentoxide in that a transparent vanadium solution can be obtained efficiently.

In the first step, the entire amount of the mixture after the wet mixing is dried for removing the solvent to obtain the copper vanadium composite oxide represented by the above-mentioned general formula (1). The composition of the obtained copper vanadium composite oxide roughly corresponds with the molar ratio of the Cu atoms to the Ca atoms to the V atoms in the Cu source, the Ca source, and the V source upon feeding the raw materials.

The second step is a step of firing the raw material mixture prepared in the first step to obtain the negative thermal expansion material of the present invention.

The firing temperature in the second step is preferably 580 to 780° C. and more preferably 600 to 750° C. Meanwhile, if the firing temperature in the second step is below the above-mentioned range, the copper vanadium composite oxide represented by the above-mentioned general formula (1) tends to be insufficiently produced. If the firing temperature in the second step is above the above-mentioned range, the molten product sticking to the crucible tends to make it difficult to collect the product. The firing time in the second step is not particularly limited, but the mixture is fired for sufficient time until the negative thermal expansion material of the present invention is produced.

The production of the negative thermal expansion material of the present invention can be confirmed for example, by analyzing whether a single-phase copper vanadium composite oxide represented by the general formula (1) is obtained by X-ray diffraction. The term "single phase" as used in the present invention means that the ziesite phase (β-phase) of the copper vanadium composite oxide represented by the general formula (1) is present alone, the blossite phase (α-phase) is present alone, or the ziesite phase (β-phase) and the blossite phase (α-phase) are present as a mixed phase, and means that other diffraction peaks than the diffraction peaks derived from the copper vanadium composite oxide represented by the general formula (1) are not detected by X-ray diffraction.

In the second step, almost entire of the raw material mixture usually becomes the negative thermal expansion material comprising the copper vanadium composite oxide represented by the above-mentioned general formula (1) within a firing time of 1 hour or more, preferably 2 to 20 hours in most cases.

The firing atmosphere in the second step is not particularly limited, and the second step may be performed in any of an inert gas atmosphere, a vacuum atmosphere, an oxidizing gas atmosphere, and the atmosphere.

In the second step, the raw material mixture may be fired once or multiple times if desired. For example, the object fired once may be pulverized, and the pulverized object may be further fired for uniforming the powder characteristics.

After the firing, the fired object is suitably cooled; and pulverized, disintegrated, and classified as needed to obtain the negative thermal expansion material of interest.

A P source is added besides the Cu source, the Ca source, and the V source for mixing to prepare the raw material mixture in the first step, followed by the second step to enable producing the negative thermal expansion material in which phosphorus is further dissolved and incorporated in the copper vanadium composite oxide represented by the above-mentioned general formula (1).

The P source is preferably phosphoric acid.

The amount of the P source added in the first step is more than 0.0 and 0.3 or less and preferably more than 0.0 and 0.2 or less in terms of the molar ratio of the P atoms in the P source to the V atoms in the V source (P/V).

Examples of the method for producing the negative thermal expansion material with a spherical particle shape include a method involving drying the entire amount of the slurry after the wet mixing by spray drying using a spray dryer in the first step, followed by the second step to produce the negative thermal expansion material containing spherical particles with a sphericity of 0.70 or more and 1.00 or less at a content of 75% or more, preferably 80% or more based on the number.

In the spray drying, the size of the sprayed droplets is not particularly limited, but preferably 1 to 40 μm and particularly preferably 5 to 30 μm. The amount of the slurry fed to the spray dryer is preferably determined in light of this viewpoint.

The temperature of hot air for drying from the spray dryer is 100 to 270° C. and preferably 150 to 230° C. due to the prevention of the powder from absorbing moisture and ease of collecting the powder.

The negative thermal expansion material comprising the copper vanadium composite oxide represented by the general formula (1) and obtained by the method for producing the negative thermal expansion material of the present invention has an average particle size of preferably 0.1 to 100 μm, particularly preferably 0.2 to 80 μm, and a BET specific surface area of 0.05 to 50 m$^2$/g, particularly preferably 0.10 to 10 m$^2$/g. The average particle size and/or the BET specific surface area of the negative thermal expansion material are preferably in the above-mentioned ranges in that in the case of using the negative thermal expansion material as a filler for resin or glass, the negative thermal expansion material is easily handled.

The particles of the negative thermal expansion material according to the present invention may be surface-treated as needed for improving the dispersibility in resin or the moisture resistance of the negative thermal expansion material. In the method for producing the negative thermal expansion material according to the present invention, the negative thermal expansion material obtained in the second step may be surface-treated as needed for improving the dispersibility in resin or the moisture resistance of the negative thermal expansion material.

Examples of the surface treatment include methods for coating the particle surfaces with silane coupling agents, titanate-based coupling agents, fatty acids or derivatives thereof, and inorganic compounds containing one or more elements selected from Zn, Si, Al, Ba, Ca, Mg, Ti, V, Sn, Co, Fe, and Zr (for example, refer to International Publication Nos. WO 2020/095837, WO 2020/261976, and WO 2019/087722, and Japanese Patent Laid-Open No. 2020-147486). The particles may be suitably surface-treated in combination thereof.

The coefficient of thermal expansion of the negative thermal expansion material obtained by the method for producing the negative thermal expansion material of the present invention is −10.0×10$^{-6}$/K or less and preferably −12.0×10$^{-6}$/K or less. The lower limit is around −50.0×10$^{-6}$/K or more and preferably −40.0×10$^{-6}$/K or more. The coefficient of thermal expansion of the negative thermal expansion material to be obtained by the method for producing the negative thermal expansion material of the present invention is particularly preferably −50.0×10$^{-6}$ to −10.0×10$^{-6}$/K in that the coefficient of the negative thermal expansion material easily offsets the positive expansion upon the combination of the negative thermal expansion material of the present invention with the positive thermal expansion material.

The negative thermal expansion material of the present invention is used as powder or paste. If the negative thermal expansion material of the present invention is used as paste, the negative thermal expansion material of the present invention is mixed and dispersed in a solvent and/or a liquid resin with low viscosity for use as paste. The negative thermal expansion material of the present invention may be used as the paste by dispersing the negative thermal expansion material in a solvent and/or a liquid resin with low viscosity and further optionally adding a binder, a flux material, and a dispersant.

The negative thermal expansion material of the present invention is used in combination with various organic or inorganic compounds as the positive thermal expansion material, and the combination thereof is used as a composite material. The composite material of the present invention comprises the negative thermal expansion material and the positive thermal expansion material.

Examples of the organic compounds to be used as the positive thermal expansion material include, but not particularly limited to, rubber, polyolefin, polycycloolefin, polystyrene, ABS, polyacrylates, polyphenylene sulfide, phenolic resin, polyamide resin, polyimide resin, epoxy resin, silicone resin, polycarbonate resin, polyethylene resin, polypropylene resin, polyethylene terephthalate resin (PET resin), and polyvinyl chloride resin. Examples of the inorganic compounds to be used as the positive thermal expansion material include silicon dioxide, silicates, graphite, sapphire, various glass materials, concrete materials, and various ceramic materials.

Since the composite material of the present invention contains the negative thermal expansion material with better negative thermal expansion characteristics, a negative coefficient of thermal expansion, a zero coefficient of thermal expansion, or a low coefficient of thermal expansion can be achieved depending on the ratio of the negative thermal expansion material to another compound.

EXAMPLES

Hereinafter, the present invention will be described by Examples, but is not limited thereto.

Example 1

First, 1.73 g of vanadium pentoxide (V$_2$O$_5$: average particle size: 1.0 μm), 1.51 g of copper oxide (CuO: average particle size: 1.5 μm), and 0.03 g of calcium carbonate (CaCO$_3$: average particle size: 2.4 μm) were weighed, and pulverized and mixed in 30 ml of ethanol as a dispersion medium with a mortar for 20 minutes. The entire amount thereof was then dried to obtain a raw material mixture. This raw material mixture was fired in the atmosphere at 700° C. for 4 hours to obtain a fired article. In the X-ray diffraction analysis of the obtained fired article, a single-phase copper vanadium composite oxide, (Cu$_{2.00}$Ca$_{0.03}$)V$_{2.00}$O$_{7.00}$, with the ziesite phase having the main diffraction peak at around 2θ=25° was obtained. FIG. 1 shows the X-ray diffraction pattern of the fired article.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

Example 2

Figure 2:
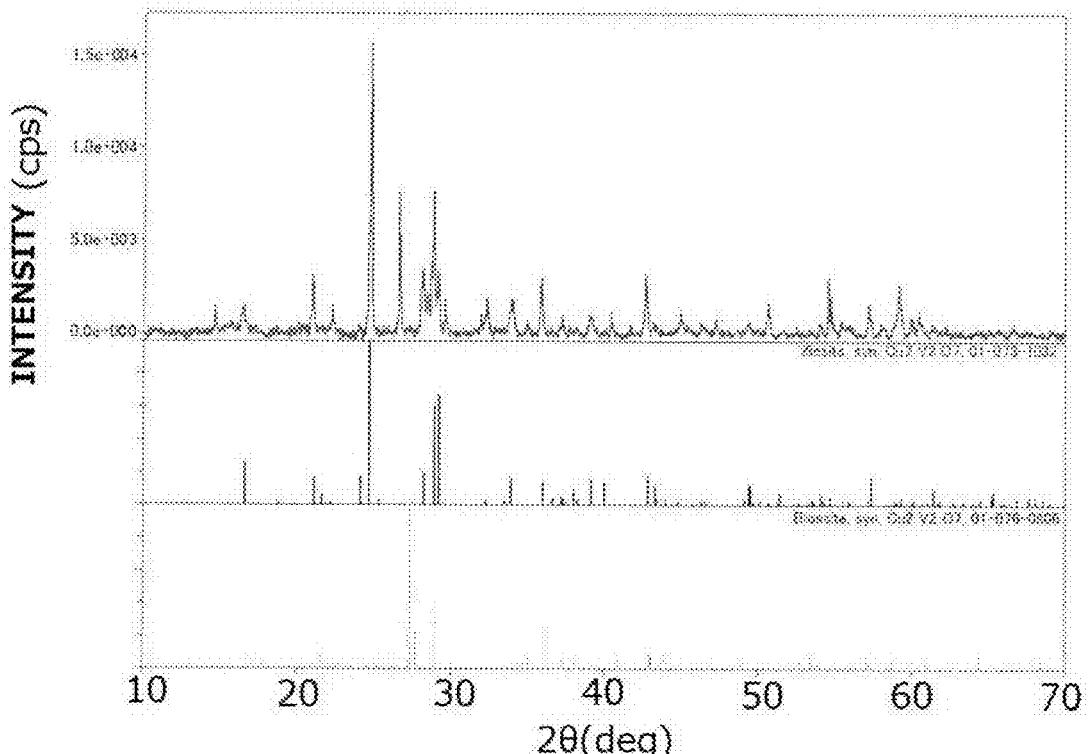
FIG. 2 is the X-ray diffraction pattern of a negative thermal expansion material sample obtained in Example 2.

First, 1.73 g of vanadium pentoxide (V$_2$O$_5$: average particle size: 1.0 μm), 1.51 g of copper oxide (CuO: average particle size: 1.5 μm), and 0.190 g of calcium carbonate (CaCO$_3$: average particle size: 2.4 μm) were weighed, and pulverized and mixed in 30 ml of ethanol as a dispersion medium with a mortar for 20 minutes. The entire amount thereof was than dried to obtain a raw material mixture. This raw material mixture was fired in the atmosphere at 700° C. for 4 hours to obtain a fired article. In the X-ray diffraction analysis of the obtained fired article, a copper vanadium composite oxide, $(Cu_{2.00}Ca_{0.20})V_{2.00}O_{7.00}$, in which the ziesite phase having the main diffraction peak at around $2\theta=25°$, and the blossite phase having the main diffraction peak at around $2\theta=270$ of $Cu_2V_2O_7$ were detected was obtained. FIG. 2 shows the X-ray diffraction pattern of the fired article.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

Example 3

Figure 3:
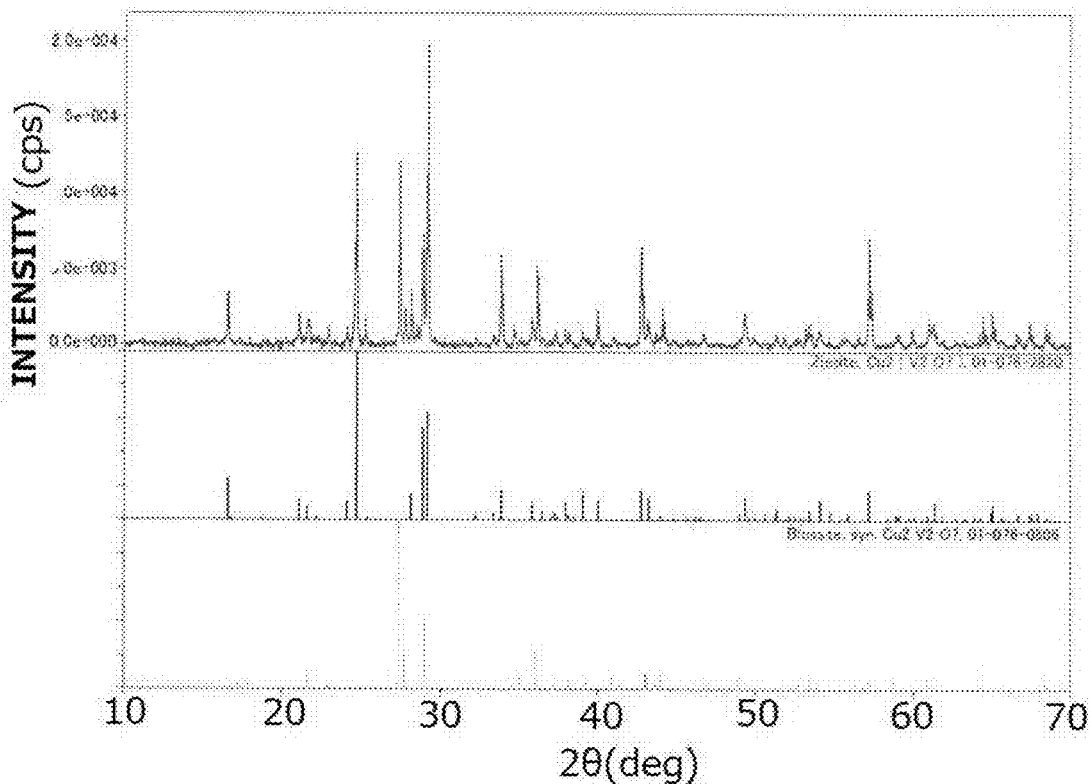
FIG. 3 is the X-ray diffraction pattern of a negative thermal expansion material sample obtained in Example 3.

First, 1.76 g of vanadium pentoxide ($V_2O_5$: average particle size: 1.0 μm), 1.51 g of copper oxide (CuO: average particle size: 1.5 μm), and 0.03 g of calcium carbonate ($CaCO_3$: average particle size: 2.4 μm) were weighed, and pulverized and mixed in 30 ml of ethanol as a dispersion medium with a mortar for 20 minutes. The entire amount thereof was then dried to obtain a raw material mixture. This raw material mixture was fired in the atmosphere at 700° C. for 4 hours to obtain a fired article. In the X-ray diffraction analysis of the obtained fired article, a copper vanadium composite oxide, $(Cu_{1.97}Ca_{0.03})V_{2.00}O_{7.00}$, in which the ziesite phase having the main diffraction peak at around $2\theta=25°$, and the blossite phase having the main diffraction peak at around $2\theta=27°$ of Cu2V2O7 were detected was obtained. FIG. 3 shows the X-ray diffraction pattern of the fired article.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

Example 4

Figure 4:
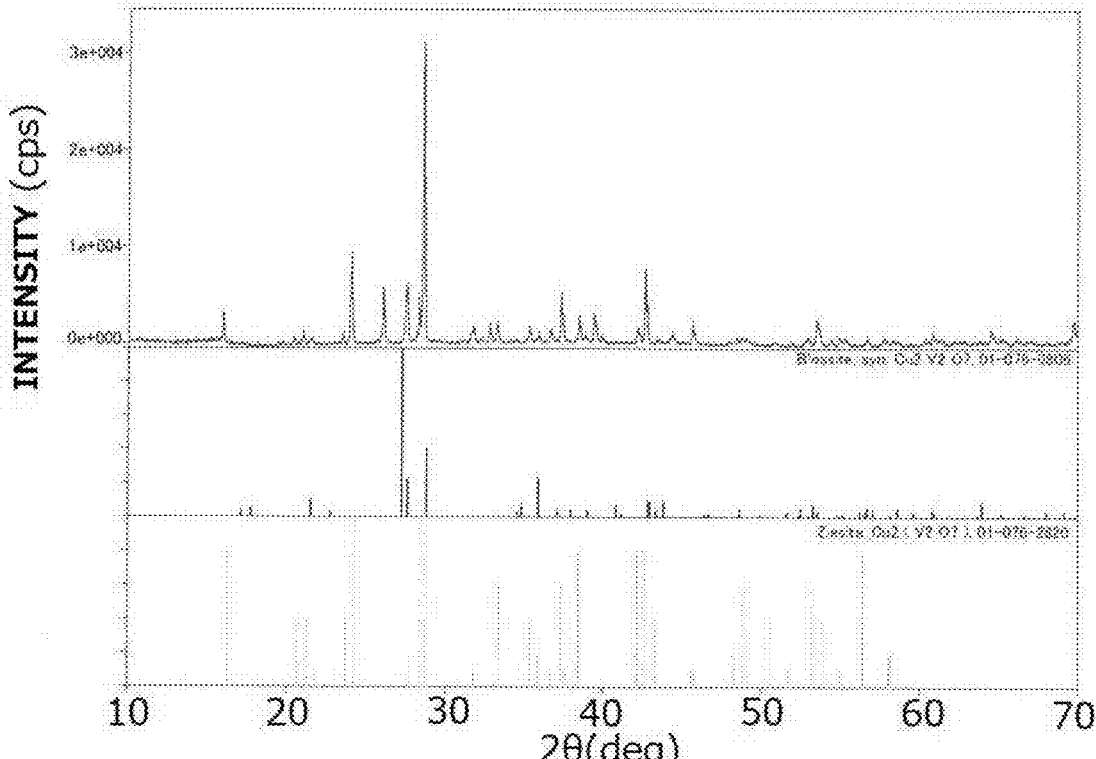
FIG. 4 is the X-ray diffraction pattern of a negative thermal expansion material sample obtained in Example 4.

First, 2.04 g of vanadium pentoxide ($V_2O_5$: average particle size: 1.0 μm), 1.51 g of copper oxide (CuO: average particle size: 1.5 μm), and 0.34 g of calcium carbonate ($CaCO_3$: average particle size: 2.4 μm) were weighed, and pulverized and mixed in 30 ml of ethanol as a dispersion medium with a mortar for 20 minutes. The entire amount thereof was then dried to obtain a raw material mixture. This raw material mixture was fired in the atmosphere at 700° C. for 4 hours to obtain a fired article. In the X-ray diffraction analysis of the obtained fired article, a copper vanadium composite oxide, $(Cu_{1.70}Ca_{0.30})V_{2.00}O_{7.00}$, in which the ziesite phase having the main diffraction peak at around $2\theta=25°$, and the blossite phase having the main diffraction peak at around $2\theta=27°$ of Cu2V2O7 were detected was obtained. FIG. 4 shows the X-ray diffraction pattern of the fired article.

The fired article was then pulverized with a mortar to obtain a negative thermal expansion material sample. The observation of the randomly sampled fifty particles from this negative thermal expansion material sample with electron microscope (at a magnification of 400) showed that the particle shape was a crushed shape.

Comparative Example 1

Figure 5:
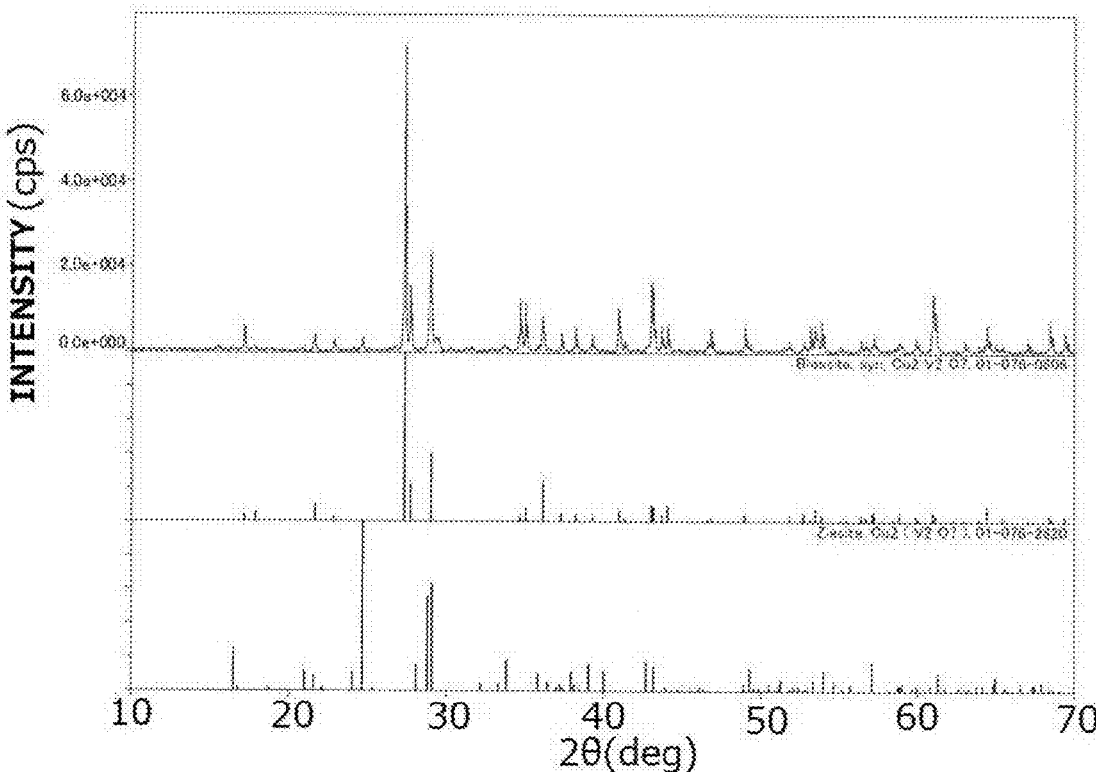
FIG. 5 is the X-ray diffraction pattern of a negative thermal expansion material sample obtained in Comparative Example 1.

First, 1.71 g of vanadium pentoxide ($V_2O_5$: average particle size: 1.0 μm) and 1.50 g of copper oxide (CuO:

average particle size: 1.5 μm) were pulverized and mixed in 30 ml of ethanol as a dispersion medium with a mortar for 20 minutes. The mixture was then dried to obtain a raw material mixture. This powder was fired in the atmosphere at 700° C. for 4 hours to obtain a fired article. In the X-ray diffraction analysis of the obtained fired article, a single phase of the blossite phase of $Cu_2V_2O_7$ having the main diffraction peak at around $2\theta=27°$ was detected. FIG. 5 shows the X-ray diffraction pattern of the fired article.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

(Physical Properties Evaluation)

The negative thermal expansion material samples obtained in Examples and Comparative Example were measured for average particle size, BET specific surface area, and the coefficient of thermal expansion. The average particle sizes and the coefficients of thermal expansion were measured as follows. Table 1 shows the results thereof.

(Average Particle Size)

Each negative thermal expansion material sample was observed through a scanning electron microscope at a magnification of 1000. The longest diameters of 20 particles randomly sampled from the observation visual field were measured to calculate the arithmetic mean value thereof as the average particle size of the negative thermal expansion material sample.

(Measurement of Coefficient of Thermal Expansion)

<Manufacturing of Molding>

To 1.00 g of a sample was added 0.05 g of propylene carbonate, and the mixture was pulverized and mixed with a mortar for 3 minutes. Then, 0.15 g thereof was weighed, and the whole amount thereof was filled into a metal mold with a diameter of 6 mm and subsequently molded with a hand press at a pressure of 0.5 t to manufacture a powder molding. The temperature of the obtained powder molding was raised to 700° C. over 3 hours and held for 4 hours with an electric furnace to manufacture a ceramic molding.

<Measurement of Coefficient of Thermal Expansion>

The manufactured ceramic molding was measured for the coefficient of thermal expansion with a thermomechanical measuring apparatus (TMA4000SE available from NETZSCH Japan K.K.). The measurement was repeated twice under the measurement conditions of a nitrogen atmosphere, a load of 10 g, and a temperature range of 50 to 425° C. The coefficient of thermal expansion at 50 to 400° C. of the second repeated measurement was defined as the coefficient of thermal expansion of the negative thermal expansion material sample.

TABLE 1

| | Average particle size (μm) | BET specific surface area (m²/g) | Linear coefficient of expansion (×10⁻⁶/K) |
|---|---|---|---|
| Example 1 | 13 | 0.26 | −28.7 |
| Example 2 | 12 | 0.35 | −18.3 |
| Example 3 | 13 | 0.26 | −21.5 |
| Example 4 | 10 | 0.45 | −14.8 |
| Comparative Example 1 | 18 | 0.40 | −2.3 |

Note that the linear coefficient of expansion of the negative thermal expansion material sample in Comparative Example 1 at 50 to 300° C. was −4.4×10⁻⁶/K.

Example 5

First, 1.73 g of vanadium pentoxide ($V_2O_5$: average particle size: 1.0 μm), 1.51 g of copper oxide (CuO: average particle size: 1.5 μm), 0.029 g of calcium carbonate ($CaCO_3$: average particle size: 2.4 μm), and 0.033 g of 85% by mass phosphoric acid ($H_3PO_4$) were weighed, and pulverized and mixed in 30 ml of ethanol as a dispersion medium with a mortar for 20 minutes. The entire amount thereof was then dried to obtain a raw material mixture. This raw material mixture was fired in the atmosphere at 700° C. for 4 hours to obtain a fired article.

In the X-ray diffraction analysis of the obtained fired article, a copper vanadium composite oxide, ($Cu_{2.00}Ca_{0.06}$)($V_{2.00}P_{0.06})O_{7.00}$, in which a single phase of the blossite phase of $Cu_2V_2O_7$ having the main diffraction peak at around $2\theta=27°$ was detected was obtained.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

Example 6

First, 16.6 parts by mass of vanadium pentoxide ($V_2O_5$: average particle size: 1.0 μm), 14.1 parts by mass of copper oxide (CuO: average particle size: 1.5 μm), and 0.5 parts by mass of calcium carbonate ($CaCO_3$: average particle size: 2.4 μm) were weighed and added to 68.5 parts by mass of pure water as a dispersion medium, followed by stirring for 30 minutes to prepare 31.3% by mass slurry.

To the slurry was then added 0.1 parts by mass of ammonium polycarboxylate as a dispersant. Zirconia beads with a diameter of 0.5 mm were added to the slurry with stirring. The slurry was fed to a medium stirring bead mill, followed by wet pulverization. The average particle size of the solid matter after the wet pulverization was determined as 0.59 μm by laser diffraction/scattering.

The slurry after the wet pulverization was then fed to a spray dryer set at 220° C. at a rate of 3.3 L/h, followed by spray drying to obtain a raw material mixture.

The raw material mixture was then fired in the atmosphere at 700° C. for 4 hours to obtain a fired article. The fired article was pulverized with a mortar and then pulverized with a jet mill to obtain a pulverized material. In the X-ray diffraction analysis of the obtained pulverized material, it was confirmed that the pulverized material was a copper vanadium composite oxide, ($Cu_{1.94}Ca_{0.06}$) $V_{2.00}O_{7.00}$, with the ziesite phase, having the main diffraction peak at around $2\theta=25°$. This was considered to be a negative thermal expansion material sample.

The observation of the randomly sampled fifty particles from this negative thermal expansion material sample with electron microscope (at a magnification of 400) showed that the particle shape was spherical.

(Physical Properties Evaluation)

Figure 6:
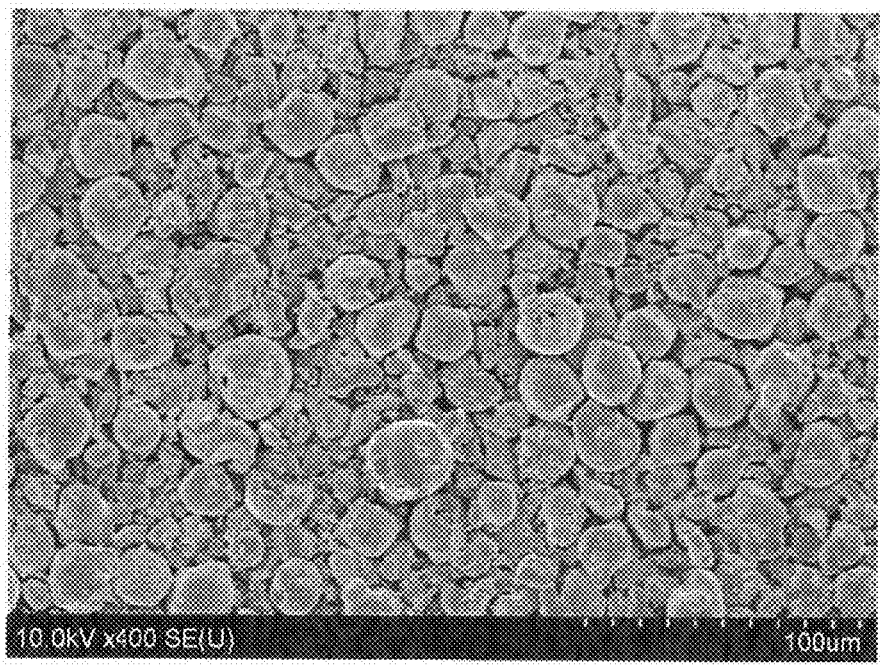
FIG. 6 is a SEM photograph of a negative thermal expansion material obtained in Example 6 (at a magnification of 400).

Each of the negative thermal expansion material samples obtained in Examples 5 to 6 was measured for average particle size, BET specific surface area, and the coefficient of thermal expansion. The average particle size and the coefficient of thermal expansion were measured in the same way as in Examples 1 to 4. The sphericity of the negative thermal expansion material sample of Example 6 was determined by the following method. FIG. 6 shows an SEM photograph of the negative thermal expansion material sample obtained in Example 6.

(Measurement of Spherical Particle Content)

The sphericities of 50 particles randomly sampled at a magnification of 400 were determined with the image analyzer LUZEX (available from NIRECO CORPORATION) in accordance with the following calculation expression. The content of spherical particles with sphericities of 0.70 or more and 1.00 or less based on the number was evaluated.

$$\text{Sphericity}=\text{diameter equivalent to diameter of circle with equal area/circumscribed circle diameter}$$

Diameter equivalent to diameter of circle with equal area: the diameter of a circle having a circumference that is equivalent to the perimeter of a particle Circumscribed circle diameter: longest diameter of the particle

TABLE 2

| | Average particle size (μm) | BET specific surface area (m²/g) | Content of spherical particles (%) | Linear coefficient of expansion (×10⁻⁶/K) |
|---|---|---|---|---|
| Example 5 | 20 | 0.28 | — | −16.5 |
| Example 6 | 24 | 0.39 | 91 | −16.2 |

Notes)
The symbol "—" in the table means "unmeasured".

The invention claimed is:

1. A negative thermal expansion material, comprising a copper vanadium composite oxide represented by the following general formula (1):

$$Cu_xCa_yV_zO_t \qquad (1)$$

wherein $1.50 \le x \le 2.20$, $0 < y \le 0.40$, $1.70 \le z \le 2.30$, $6.00 \le t \le 9.00$, and $1.50 < x+y \le 2.60$, wherein the copper vanadium composite oxide has a crystal structure with a single phase of a ziesite phase (β-phase) or a mixed phase of the ziesite phase (β-phase) and a blossite (α-phase) derived from $Cu_2V_2O_7$.

2. The negative thermal expansion material according to claim 1, wherein a coefficient of thermal expansion is −10.0×10⁻⁶/K or less.

3. The negative thermal expansion material according to claim 2, wherein an average particle size is 0.1 to 100 μm.

4. The negative thermal expansion material according to claim 2, wherein BET specific surface area is 0.05 to 50 m²/g.

5. The negative thermal expansion material according to claim 2, wherein a content of spherical particles with a sphericity of 0.7 or more and 1.0 or less is 75% or more based on the number.

6. The negative thermal expansion material according to claim 2, wherein the negative thermal expansion material further comprises dissolved phosphorus.

7. The negative thermal expansion material according to claim 1, wherein an average particle size is 0.1 to 100 μm.

8. The negative thermal expansion material according to claim 1, wherein BET specific surface area is 0.05 to 50 m²/g.

9. The negative thermal expansion material according to claim 1, wherein a content of spherical particles with a sphericity of 0.7 or more and 1.0 or less is 75% or more based on the number.

10. The negative thermal expansion material according to claim 1, wherein the negative thermal expansion material further comprises dissolved phosphorus.

11. A composite material, comprising the negative thermal expansion material according to claim 1 and a positive thermal expansion material.

12. The composite material according to claim 11, wherein the positive thermal expansion material is at least one selected from metals, alloys, glasses, ceramics, rubbers, and resins.

13. A composite material, comprising the negative thermal expansion material according to claim 2 and a positive thermal expansion material.

14. The composite material according to claim 13, wherein the positive thermal expansion material is at least one selected from metals, alloys, glasses, ceramics, rubbers, and resins.

15. A molded article comprising the negative thermal expansion material according to claim 1.

* * * * *